(12) United States Patent
Schmidt et al.

(10) Patent No.: US 12,306,392 B2
(45) Date of Patent: May 20, 2025

(54) METHOD, APPARATUS AND COMPUTER PROGRAM FOR LOCALIZING AN EMITTER IN A SAMPLE

(71) Applicant: ABBERIOR INSTRUMENTS GMBH, Göttingen (DE)

(72) Inventors: Roman Schmidt, Gottingen (DE); Winfried Willemer, Bovenden (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 62 days.

(21) Appl. No.: 18/015,770

(22) PCT Filed: Aug. 6, 2021

(86) PCT No.: PCT/EP2021/071973
§ 371 (c)(1),
(2) Date: Jan. 12, 2023

(87) PCT Pub. No.: WO2022/029280
PCT Pub. Date: Feb. 10, 2022

(65) Prior Publication Data
US 2023/0251479 A1      Aug. 10, 2023

(30) Foreign Application Priority Data

Aug. 7, 2020  (EP) .................................... 20190122
Jan. 13, 2021  (DE) ..................... 10 2021 100 564.7
Apr. 1, 2021   (EP) .................................... 21166713

(51) Int. Cl.
*G02B 21/00*    (2006.01)
*G01N 21/64*    (2006.01)

(52) U.S. Cl.
CPC ..... *G02B 21/0072* (2013.01); *G01N 21/6456* (2013.01); *G02B 21/0036* (2013.01); *G02B 21/0076* (2013.01); *G01N 2201/105* (2013.01)

(58) Field of Classification Search
CPC ............ G02B 21/0072; G02B 21/0036; G02B 21/0076; G02B 21/008; G01N 21/6456; G01N 2201/105
See application file for complete search history.

(56) References Cited

U.S. PATENT DOCUMENTS

2011/0060232 A1* 3/2011 Lin ...................... A61B 3/1233
                                                    424/9.6
2020/0183140 A1* 6/2020 Manian .............. G01N 21/6486
2023/0296520 A1   9/2023 Harke et al.

FOREIGN PATENT DOCUMENTS

DE      10 2011 055 367 A1      5/2013
DE      10 2013 113 860 B3      5/2015
(Continued)

OTHER PUBLICATIONS

Klaus et al. "Minflux nanoscopy delivers 3D multicolor nanometer resolution in cells", Nature Methods, vol. 17, Feb. 2020, p. 217-224. (Year: 2020).*

(Continued)

*Primary Examiner* — David P Porta
*Assistant Examiner* — Mamadou Faye
(74) *Attorney, Agent, or Firm* — MOSER TABOADA

(57) ABSTRACT

The invention relates to a method for localizing an emitter (F) in a sample (S) comprising illuminating the sample (S) with a stationary donut-shaped excitation beam (E), acquiring fluorescence photons; and estimating a position of the emitter (F) in the sample (S) from the acquired fluorescence photons. The invention further relates to an apparatus (1) for localizing an emitter (F) in a sample (S) comprising illumination means (10), acquisition means (20) and processing means (30) and a computer program comprising instruction to cause the apparatus (1) to execute the method for localizing an emitter (F).

20 Claims, 3 Drawing Sheets

(56) References Cited

FOREIGN PATENT DOCUMENTS

WO     WO 2015/052186 A1     4/2015
WO     WO 2020/128106 A1     6/2022

OTHER PUBLICATIONS

Oleksii et al. "Fluorescent Diarylethene Photoswitches—A Universal Tool for Super-Resolution Microscopy in Nanostructured Materials", Wiley-VCH Verlag Gmbh & Co. KGaA, 2018, p. 1-12 (Year: 2018).*

International Search Report for PCT/EP2021/071973 dated Nov. 12, 2021.

Balzarotti et al.: "Supplementary Materials for Nanometer resolution imaging and tracking of fluorescent molecules with minimal photon fluxes", Science, vol. 355, No. 6325, Dec. 22, 2016, pp. 606-612.

Balzarotti et al.: "Nanometer resolution imaging and tracking of fluorescent molecules with minimal photon fluxes", arXiv:1611.03401 [physics.optics] (2016).

Gwosch et al.: "Minflux nanoscopy delivers 3D multicolor nanometer resolution in cells", Nature Methods, Nature Pub. Grou, New York, vol. 17, No. 2, Jan. 13, 2020, pp. 217-224.

Schmidt et al.: "Minflux nanometer-scale 3D imaging and microsecond-range tracking on a common fluorescence microscope", Nature Communications 12(1), 1-12 (2021).

Klaus C. Gwosch et al., "Minflux nanoscopy delivers 3D multicolor nanometer resolution in cells", Nature Methods, Jan. 13, 2020, pp. 217-224, 17(2), DOI: 10.1038/S41592-019-0688-0, Supplementary Information.

Jasmin Kathrin Pape, "Multicolor 3D Minflux Nanoscopy for Biological Imaging", PHD Thesis, Nov. 12, 2020, 142 pages, http://link.edgepilot.com/s/a04c6a3b/P1jcQtYqv0KEsM7Z935d8Q?u=https://ediss.uni-goettingen.de/bitstream/handle/21.11130/00-1735-0000-0005-14E6-1PhDThesisJasminPape_forPublicationfinal.pdf?sequence=1%26isAllowed=y.

Jasmin K. Pape et al., "Multicolor 3D Minflux nanoscopy of mitochondrial Micos proteins", PNAS, Aug. 25, 2020, pp. 20607-20614 + Supplementary Information ,vol. 117 No. 34, www.pnas.org/cgi/doi/10.1073/pnas.2009364117.

* cited by examiner

METHOD, APPARATUS AND COMPUTER PROGRAM FOR LOCALIZING AN EMITTER IN A SAMPLE

TECHNICAL AREA

The invention relates to a method, an apparatus and a computer program for localizing an emitter in a sample. In particular, the method can be applied to pre-localize emitters in a MINFLUX localization, wherein the position estimates obtained by the method according to the present invention can be used as a starting point for the MINFLUX localization.

PRIOR ART

Localization and single molecule tracking methods based on the MINFLUX procedure have been described in the prior art, e.g., in patent applications DE 10 2011 055 367 A1, WO 2015/052186 A1, the patent publication DE 10 2013 114 860 B3, and in the publication Balzarotti F, Eilers Y, Gwosch K C, Gynnå, A, Westphal V, Stefani F, Elf J, Hell SW "Nanometer resolution imaging and tracking of fluorescent molecules with minimal photon fluxes", arXiv: 1611.03401 [physics.optics] (2016).

Essentially, a sample containing fluorophores is probed by an intensity distribution of excitation light which excites the fluorophores triggering the emission of fluorescence photons. The intensity distribution has a local minimum (particularly having an intensity close to zero at a center of the distribution) flanked by maxima. Such distributions are known, e.g., from STED microscopy, where an intensity distribution of depletion light with a central minimum (e.g., a 2D or 3D donut) is formed to deplete fluorescence signals from off-center fluorophores, increasing the effective resolution beyond the diffraction limit.

MINFLUX nanoscopy, however, makes use of the fact that a minimum fluorescence signal (ideally zero) is obtained if the fluorophore of interest is positioned exactly at the minimum of the excitation light distribution, whereas the fluorescence signal increases as the distribution is moved away from the minimum. In MINFLUX localization, the excitation light distribution is sequentially positioned at several locations (forming a so-called "targeted coordinate pattern", TCP, also termed 'set of target coordinates', STC) close to an expected position of the fluorophore, a fluorescence signal is measured at each of these positions, and a position estimate of the fluorophore is determined from the measured fluorescence signals and the corresponding positions of the excitation light distribution, e.g., by a least mean square estimator.

This process is typically iterated, i.e., the process is repeated by placing the minimum of the excitation light distribution at locations around the position estimate obtained in the previous step. In particular, the minimum is placed within a radius around the current position estimate, wherein the radius decreases in each step, which results in an improved effective resolution in each step, converging to values as low as 1 nm depending on the sample and measurement parameters.

In addition, MINFLUX localization is highly photon-efficient, since less and less light is emitted by the fluorophore as the positions of the excitation minimum get closer to the actual position of the fluorophore.

By sequentially determining the position of several single fluorophores in a sample using the MINFLUX scheme, a fluorescence image of the sample with resolutions in the range of 1 nm can be constructed.

In a related technique called MINFLUX tracking, the trajectory of a single fluorophore is followed over time by sequential MINFLUX localizations optimized for speed instead of accuracy.

In both methods, the excitation light beam is preferentially moved relative to the sample to the positions of the TCP by fast beam deflection means, such as electro optical deflectors, to decrease the measurement time.

To localize or track a fluorescent molecule using MINFLUX, it is necessary to identify single fluorophores in the sample and obtain initial position information on the identified single molecule. The TCP can then be placed in the vicinity of the initial position estimate, and the minimum of the excitation light distribution can be moved sequentially to the positions of the TCP as described above.

For example, the initial position of the fluorophore may be determined by wide field illumination of the sample and low-resolution fluorescence detection by a camera, e.g., in a similar manner as in PALM/STORM microscopy.

This requires a microscopy system which is able to quickly switch between wide field illumination and confocal illumination with a donut-shaped excitation beam, which is technically demanding, especially considering that switching needs to take place before each localization of an individual fluorophore, which may significantly slow the localization process. In addition, high photon counts are necessary for camera detection of fluorescence and therefore fluorophores must be exposed to the excitation light either for long periods of time or at high intensities. This either slows down the localization process or bears the danger of photobleaching and photo-toxicity (in case of living samples).

In an alternative method known from the prior art (e.g., disclosed in Balzarotti F, Eilers Y, Gwosch KC, Gynnå, A, Westphal V, Stefani F, Elf J, Hell SW "Nanometer resolution imaging and tracking of fluorescent molecules with minimal photon fluxes", arXiv:1611.03401 [physics.optics] (2016)) a Gaussian-shaped excitation light beam is scanned over a region of interest of the sample, and fluorescence photons are detected by a confocal point detector, until the photon counts reach a pre-determined threshold. Scanning is stopped at a position of interest where the threshold photon count was obtained. Subsequently, the Gaussian excitation beam is placed at several locations around the position of interest, and the corresponding photon counts are determined by the point detector. Due to the pre-determined shape of the Gaussian excitation beam and the corresponding shape of the emission (detection) point spread function, it is possible to determine the approximate position of the fluorophore from the positions of the Gaussian excitation beam and the associated photon counts, e.g., by a so-called modified least mean square estimator.

This procedure is often combined with photo-activation of fluorophores by an activation laser beam centered at the scanned region of interest to maximize the chance that fluorescence emitters are found in the region of interest.

Although this method provides reliable pre-localization of fluorophores with a decreased danger of photobleaching compared to camera detection, it requires beam generation optics for two different excitation beam shapes, a Gaussian beam and a donut-shaped beam, with fast switching between the beam shapes and the possibility to displace both beams quickly and with high precision (ideally using electro optical deflectors). In addition, the excitation beams must be precisely aligned with the activation light beam (if applicable).

This results in a highly complex and expensive MIN-FLUX system.

Problem

Thus, the objective underlying the present invention is to provide a method for localizing an emitter in a sample, wherein the obtained position estimate is suitable as an initial position estimate for MINFLUX localization or MIN-FLUX tracking, that minimizes the complexity and costs of the optical instrumentation used.

Solution

This objective is attained by the subject matter of the claims and the specification, particularly the method according to claim 1, the apparatus according to claim 12 and the computer program according to claim 15. Embodiments of the invention are stated in sub claims 2 to 11 and 13 to 14 and are described hereafter.

DESCRIPTION OF THE INVENTION

A first aspect of the invention relates to a method for localizing an emitter in a sample comprising illuminating the sample with a stationary donut-shaped excitation beam, acquiring fluorescence photons; and estimating a position of the emitter in the sample from the acquired fluorescence photons.

As used herein, the term "emitter" describes a molecule or a particle which emits light, particularly luminescence light, more particularly fluorescence light, if illuminated with excitation light. In particular, the emitter may be activatable, wherein activation transmits the emitter from an inactive state in which the emitter does not emit fluorescence in response to the excitation light into an active state in which the emitter emits fluorescence in response to the excitation light. This activation may be achieved by illuminating the emitter with activation light of a suitable wavelength (which may be the same wavelength as the excitation light or a different wavelength compared to the wavelength of the excitation light) and intensity. Alternatively, the emitter may be capable of entering the active state spontaneously, i.e., without activation light, e.g., as a consequence of thermal fluctuations. Yet alternatively, the emitter may be non-activatable and always reside in the active state.

The excitation beam or excitation light beam is stationary, i.e., does not move with respect to the sample during a current acquisition of the fluorescence photons. This has the advantage that the measurement is not affected directly by the shape of the donut-shaped excitation beam.

In the context of the present specification, the term 'donut-shaped excitation beam' means that the excitation beam comprises a local intensity minimum at a center coinciding with an optical axis (z-direction) along which the excitation beam propagates, flanked by intensity maxima in at least one direction, particularly at least two directions in space. This definition includes a local minimum surrounded by a ring-shaped maximum in the focal plane, which appears as two maxima flanking the central minimum in a cross-section parallel to the optical axis. In particular, the donut-shaped excitation beam may be shaped as a 2D donut or a 3D donut. A '2D donut', as used herein, comprises a local intensity minimum flanked by intensity maxima in a plane perpendicular to the optical axis (i.e., in x- and y-direction), particularly the focal plane. A '3D donut', which may also be designated as 'bottle beam' comprises a local intensity minimum flanked by intensity maxima in all three dimensions, i.e., both along the optical axis and in the plane perpendicular to the optical axis.

The fluorescence photons may be acquired by an acquisition means comprising at least one detector configured for single photon counting. In particular, the at least one detector may be a point detector, such as, e.g., a photomultiplier tube, an avalanche photodiode or a hybrid detector combining properties of photomultiplier tubes and avalanche photodiodes. In particular, the at least one detector is arranged in a confocal plane in respect of a focal plane in the sample.

The inventors have surprisingly found that a donut-shaped excitation beam which is applied in MINFLUX localization and MINFLUX tracking according to the prior art, can be used to identify and pre-localize an emitter in a region of interest of the sample without moving the excitation beam with respect to the sample with sufficient accuracy for a subsequent MINFLUX localization with high photon efficiency.

In methods according to the prior art, pre-localization is usually performed by scanning a Gaussian excitation beam over the sample. Applying a donut-shaped beam with a local minimum to this end appears counter-intuitive since the excitation light intensity at the center of the beam is close to zero so that emitters could not be detected when positioned at the center or close to the center of the donut. However, when coarsely scanning the sample for emitters the probability of placing the donut center exactly at the position of an emitter is actually very low. In addition, the inventors have found a way to localize an emitter at a fixed position of the excitation beam.

In contrast to estimation of the position of the emitter during a MINFLUX localization or tracking sequence, the position of the emitter is not estimated from fluorescence photon counts associated with different positions of the excitation light beam relative to the sample. Instead, the position of the emitter is particularly estimated from a plurality of fluorescence photon counts detected in a position-specific manner while keeping the position of the excitation light beam constant with respect to the sample. In particular, the position specificity of detection may be achieved, e.g., by sampling or measuring a spatial distribution of the light emitted by the emitter. This may be achieved, e.g., by altering the path of light between a detector pinhole and the sample, thus effectively altering the position of a pinhole projection in the focal plane in the sample. Alternatively, the spatial distribution of the emitted light in a detector plane may be directly measured, e.g., by an array detector comprising several detector elements arranged in a two-dimensional pattern in the detector plane. The position of the emitter can be determined, e.g., by a least mean square estimator, from the fluorescence photon counts and the configuration of the corresponding detection beam path.

The described solution has the advantage that it improves the efficiency of the search process for the emitter. Contrary to previous MINFLUX implementations, this localization mode does not resort to a regularly focused beam, such as a Gaussian shaped excitation beam. Instead, the same beam shape may be applied both for the pre-localization step and the MINFLUX localization or tracking sequence. This significantly simplifies the setup, as it makes dedicated hardware for microsecond-scale switching between different focal intensity distributions, e.g., between a Gaussian shape and a donut shape, redundant. The spatial light modulators that are typically used for switching between a Gaussian shape and a donut shape are usually too slow to switch between the shapes during a measurement routine. While the catch range, in other words the size of the area, in which single emitters can be detected, depends on several parameters, the donut shape facilitates the catch range or catch area to be extended beyond that of a Gaussian shape.

In certain embodiments, the fluorescence photons are acquired in a position-specific manner. In particular, position-specific detection of the fluorescence photons is performed in an image plane arranged confocally with respect to a plane of an excitation focus of the excitation beam (i.e., the focal plane). The position-dependent acquisition may be implemented, e.g., by projecting an image of a detector pinhole at different locations in the focal plane in the sample while the excitation beam remains stationary with respect to the sample. Alternatively, e.g., an array detector comprising a plurality of detector elements arranged in a two-dimensional array in a plane perpendicular to the optical axis may be used for the position specific detection (while the excitation beam remains stationary with respect to the sample) by directly measuring the spatial distribution of the emitted light.

In certain embodiments, the method comprises projecting a pinhole, particularly sequentially projecting a pinhole, to first probe positions, particularly of a first targeted coordinate pattern. In particular, the fluorescence photons are acquired for the first probe positions or for the projection of the pinhole center being located at the first probe positions. In other words, a pinhole is arranged in a detector light path between a detector of the acquisition means and the sample, and an image of the pinhole is generated at several locations in a focal plane in the sample. This method is also referred to as 'pinhole orbit scanning' hereafter. Typically, while the image of the pinhole is moved in the focal plane, the pinhole itself remains stationary. In particular, the change in the projection position of the pinhole is particularly implemented by changing the detector light path, particularly using a scanner, such as a galvanometric scanner. By changing the detector light path (e.g., by rotating mirrors of the galvanometric scanner), the de-scanning of the emitted light is altered, such that different emission light intensities or fluorescence photon counts are obtained for the different de-scanning configurations depending on the position of the emitter in the sample. From this information, the position of the emitter can be estimated, e.g., using a least mean square estimator. In case the same scanner is used for scanning the excitation light over the sample and de-scanning the emission light, as is the case in many confocal microscopy setups known from the prior art, the scanning light path will also change if the de-scanning light path is altered, which would result in a shift of the excitation light beam with respect to the sample.

To compensate this shift and ensure that the excitation light beam remains stationary with respect to the sample, additional beam deflection means may be applied as described below.

In certain embodiments, the pinhole is moved (that is, the image of the pinhole is moved) on a circular trajectory around a center, particularly in the focal plane, wherein particularly the local minimum of the donut-shaped excitation beam is positioned at the center of the circular trajectory. Therein, the term 'circular trajectory' designates a trajectory on a circular arc, which includes both partial circles and full circles. In particular, the pinhole is moved gradually or in a stepwise manner on the circular trajectory. A circular trajectory has the advantage that the distance between the center of the pinhole and the minimum of the donut-shaped excitation beam remains constant at the different positions of the pinhole projection.

In certain embodiments, the donut-shaped excitation beam comprises a maximum-to-maximum distance, wherein a diameter of the circular trajectory is 50% to 120%, particularly 60% to 100%, more particularly 70% to 90%, of the maximum-to-maximum distance. Therein, the term maximum-to maximum distance is defined as a distance, particularly a minimum distance (in case of a light intensity distribution, in which the distance between the maxima is not constant) between the maxima flanking the local intensity minimum of the donut-shaped excitation beam, particularly in the focal plane. A diameter within this range improves the chance to identify and localize an emitter in an area which is close enough to the donut-shaped excitation beam to achieve a sufficient emission signal over the background, in particular in cases where there is no previous information on the position of the emitter, e.g., if no focused activation light is provided to activate a switchable emitter, but instead emitters are always active or enter the active state stochastically (e.g., due to thermal fluctuations) in the sample. Typical values of the diameter of the circular trajectory are 250 nm to 400 nm, particularly 270 nm to 350 nm. When circular trajectories of such dimensions in the focal plane are realized, electrooptical deflectors can be used to correct the position of the donut-shaped excitation while moving the pinhole projection with another scanning device (such as a galvanometric scanner).

In certain embodiments, a diameter of the circular trajectory is 50% to 100%, particularly 60% to 80%, of a full-width-at-half-maximum (FWHM) of a detection point spread function (PSF) of the emitted light during confocal detection (i.e., the pinhole projection being centered on the local minimum of the donut-shaped excitation beam), particularly in case an activation light beam is provided to activate the emitter at an activation focus of the activation light beam, wherein more particularly the activation focus is positioned at the local minimum of the donut-shaped excitation beam. In particular, an intensity maximum of the donut-shaped excitation beam is positioned at the center of the circular trajectory. In the above-described implementation, the area of the sample which has been exposed to the activation light, and in which an activated emitter is therefore identified with an increased probability, is preferentially searched for emitters using pinhole orbit scanning. By adapting the diameter of the circular trajectory to the FWHM of the detection PSF, emitters in the searched area of the sample are exposed to a steep gradient during pinhole orbit scanning, which improves localization.

In certain embodiments, the pinhole is sequentially placed on at least three positions on a circular trajectory. In particular, the at least three positions are evenly spaced on the circular trajectory.

Advantageously, the aforementioned embodiments relating to circular trajectories provide an especially time-efficient way of spanning relatively large regions of interest to search for emitters.

In certain embodiments, the excitation beam is kept stationary using a first scanning device and a second scanning device that act in concert, i.e., a first scanning device and a second scanning device which are counteracting. In particular, the first scanning device alters a de-scanning light path to move the pinhole (that is the image of the pinhole in the focal plane) between the probe positions, wherein the second scanning device shifts the excitation beam to compensate the alteration of the de-scanning light path, such that the excitation beam remains stationary with respect to the sample.

In certain embodiments, the first scanning device is a galvanometric scanner. In certain embodiments, the second scanning device is an electro-optical scanner. In certain embodiments, the first scanning device is a galvanometric scanner and the second scanning device is an electro-optical scanner. In particular, the galvanometric scanner alters the de-scanning light path to move the pinhole (that is the image of the pinhole in the focal plane) between the probe positions, wherein the electro-optical scanner shifts the excitation beam to compensate the alteration of the de-scanning light path, such that the excitation beam remains stationary with respect to the sample.

In certain embodiments, the third scanning device comprises a deformable mirror. In certain embodiments, the third scanning device is configured to displace the excitation light beam along the optical axis (in the z-direction).

In certain embodiments, the steps of illuminating the sample with the stationary donut-shaped excitation beam and acquiring the fluorescence photons are carried out repeatedly, wherein a center of the donut-shaped excitation beam is positioned at a respective scanning position in each repetition, wherein particularly the scanning positions are arranged on a grid, more particularly a hexagonal grid. In other words, a combined search and pre-localization for emitters is performed sequentially at a plurality of scanning positions. In this manner, larger regions of interest in the sample may be searched for single emitters and their preliminary position estimate may be determined for subsequent high-accuracy MINFLUX localization. In case an emitter has been found and a sufficiently accurate position estimate has been determined, the scanning process may be aborted and a MINFLUX localization or tracking sequence may be initiated. In particular, if no emitter has been detected at a current position, the excitation beam is shifted to the next scanning position, and the search and localization procedure is repeated.

In certain embodiments, a mutual distance between the scanning positions is between 10% and 50% of an excitation wavelength of the excitation beam.

In certain embodiments, the fluorescence photons are acquired by an array detector comprising an array of detector elements. Such an array detector may be used to measure the spatial distribution of the light emitted by a single emitter and thereby obtain position-specific light intensities on different detector elements and estimate the position of the emitter from the detected light intensities or photon counts and the positions of the corresponding detector elements. Advantageously, this may be done without physically altering the de-scanning light path and without correcting the position of the excitation beam, further reducing the complexity of the measurement setup and increasing the speed of the measurement.

In certain embodiments, the detector elements are photon counting avalanche diodes (or single photon avalanche photodiodes, SPAD).

In certain embodiments, the fluorescence photons are acquired by the array detector in a first step, wherein a signal intensity distribution over the detector elements of the array detector resulting from the fluorescence photons is determined, and wherein a light path of the emitted light from the sample to the array detector is adjusted based on the determined signal intensity distribution, and wherein in a second step subsequently to the first step, further fluorescence photons from the emitter are acquired by the array detector using the adjusted light path. In particular, the position of the emitter in the sample is estimated from the fluorescence photons acquired in the first step, the second step or both the first and the second step. In particular, the light path is adjusted such that a maximum of the signal intensity distribution or a signal-weighted positional average, particularly a photon-weighted positional average, p-w-p-a, of the signal intensity distribution is closer to a center of the array detector in the second step than in the first step. A signal-weighted or photon-weighted positional average is a sum of positional vectors assigned to the individual detector elements, wherein each vector is multiplied with a weight defined as the signal intensity or photon count detected by the respective detector element divided by a sum of the signal intensities or photon counts detected by all detector elements of the array detector. The center of the array detector may be a center of gravity of the array of detector elements. This center may relate to a single detector element (e.g., in case there is an uneven number of detector elements in a row or column) or to a plurality of detector elements. In the latter case, the maximum of the signal intensity distribution is defined as an average of the signal intensities of the detector elements forming the center of the array, particularly as a signal-weighted positional average, more particularly a photon-weighted positional average. This embodiment aims at an arrangement where the emitter in the sample is arranged confocally to the center of the array detector. In this manner, more emitted light can be collected, particularly in case of relatively few detector elements.

In certain embodiments, when acquiring the fluorescence photons by the array detector comprising the array of detector elements, the excitation light beam is sequentially positioned at a plurality of scanning positions, fluorescence photons are acquired at each scanning position by a plurality of detector elements of the array detector while the excitation beam remains stationary with respect to the sample, and the position of the emitter is estimated from the fluorescence photons acquired by the detector elements at the current scanning position.

In certain embodiments, the estimated position of the emitter is determined in a pre-localization step followed by a MINFLUX localization step (i.e., a MINFLUX localization sequence). In particular, the pre-localization step is a lateral pre-localization step which estimates the position of the emitter in a plane which is perpendicular to the optical axis along which the excitation beam propagates, particularly the focal plane. More particularly, an additional axial pre-localization step to estimate the position of the emitter in an axial direction along the optical axis is performed prior to the MINFLUX-localization, even more particularly between the lateral pre-localization step and the MINFLUX localization step.

In certain embodiments, the MINFLUX localization step comprises illuminating the sample with the donut-shaped excitation beam, positioning the donut-shaped excitation beam at a plurality of second probe positions of a second targeted coordinate pattern based on the estimated position determined in the pre-localization step, acquiring fluorescence photons for each of the second probe positions, and estimating the position of the emitter in the sample from the acquired fluorescence photons acquired for the second probe positions at a higher resolution than in the pre-localization step. In contrast to the pre-localization step, the donut-shaped excitation beam is moved with respect to the sample in the MINFLUX localization step. Applying the method according to the invention in a pre-localization step followed by a MINFLUX localization step has the advantage that both steps can be performed using the same excitation light source and the same beam-shaping optics. This reduces the complexity of the apparatus according to the invention and improves the measurement speed, since it is no longer necessary to switch between light sources or alter a phase pattern on a spatial light modulator to switch between a Gaussian excitation beam and a donut-shaped excitation beam.

A second aspect of the invention relates to an apparatus (particularly a microscope or a controller for a microscope) for localizing an emitter in a sample, particularly by the method according to the first aspect, wherein the apparatus comprises: illumination means configured to illuminate the sample with a stationary donut-shaped excitation beam; acquisition means configured to acquire fluorescence photons, particularly in a position specific manner; and processing means configured to estimate a position of the emitter in the sample from the acquired fluorescence photons.

In certain embodiments, the illumination means comprises a light source, particularly a laser source, configured to generate excitation light capable of exciting the emitter in the sample.

In certain embodiments, the illumination means further comprises a beam shaping device configured to generate the donut-shaped excitation beam from the excitation light. In particular, the beam shaping device comprises a phase modulator configured to modulate the phase of the excitation light. In particular, the apparatus comprises an objective comprising a pupil plane, wherein the phase modulator is arranged at or near a plane which is conjugated to the pupil plane. In particular, the phase modulator is a phase plate or a spatial light modulator (e.g., a reflective, liquid crystal based spatial light modulator). In particular, the apparatus further comprises a polarization modifying element, e.g., a quarter wave plate, configured to circularly polarize the phase-modulated excitation light to generate the donut-shaped excitation beam. To generate an excitation beam shaped as a 2D donut, a vortex-shaped phase pattern (i.e., a phase pattern increasing from zero to a maximum, particularly $2\pi$, in a circumferential direction in respect of the optical axis) may be provided on the phase modulator, and the phase-modulated excitation beam may be circularly polarized by the polarization modifying element. Alternatively, to generate a 3D donut, a phase pattern comprising concentric rings with a phase difference of n may be provided on the phase modulator. In this case, in particular, no polarization modifying element is required.

In certain embodiments, the illumination means comprises an activation light source configured to illuminate the sample with an activation light beam configured to activate an emitter in the sample. In particular, the illumination light source is configured to focus the activation light into the sample.

In certain embodiments, the apparatus comprises projection means, particularly comprising the first scanning device, configured to project, particularly sequentially, a pinhole (i.e., an image of a pinhole) to probe positions, particularly of a targeted coordinate pattern, particularly in a focal plane in the sample.

In certain embodiments, the apparatus comprises a sample holder configured to hold the sample, a detector light path between the sample holder and a detector of the acquisition means, the pinhole, wherein the pinhole is arranged in the detection light path, and wherein the projection means comprises at least one scanning device configured to alter the detection light path, such that the pinhole is projected, particularly sequentially, to the probe positions, particularly of the targeted coordinate pattern, particularly in the focal plane of the sample. Therein, the term pinhole describes an aperture configured to adjust the diameter of a detection light beam from the sample.

In certain embodiments, the pinhole is arranged in a conjugated plane with respect to the focal plane in the sample.

By projecting the pinhole to the probe positions, position-specific information is obtained, which can be used to determine a position estimate of the emitter.

In certain embodiments, the projection means is configured to move the projection of the pinhole on a circular trajectory around a center or configured to sequentially place the pinhole on at least three positions on a circular trajectory, wherein particularly the positions are evenly spaced on the circular trajectory. In certain embodiments, the projection means is configured to move the projection of the pinhole on a circular trajectory around a center, wherein the trajectory has a diameter which is 50% to 120%, particularly 60% to 100%, more particularly 70% to 90%, of a maximum-to-maximum distance of the donut-shaped excitation beam. In certain embodiments, the projection means is configured to move the projection of the pinhole on a circular trajectory around a center, wherein the trajectory has a diameter which is 50% to 100%, particularly 60% to 80%, of a full-width-at-half-maximum of a detection point spread function of the emitted light.

In certain embodiments, the processing means is configured to estimate the position of the emitter in the sample from the acquired fluorescence photons by a least mean square estimator.

In certain embodiments, the acquisition means is configured to acquire the fluorescence photons in a position-specific manner, wherein particularly the acquisition means is configured to perform position-specific detection of the fluorescence photons in an image plane arranged confocally with respect to an excitation focus of the excitation beam.

In certain embodiments, the apparatus, particularly the projection means, comprises a first scanning device, wherein a second scanning device of the apparatus is configured to act in concert to keep the excitation beam stationary, in particularly while projecting, particularly sequentially projecting, the pinhole to the probe positions.

In certain embodiments, the first scanning device is a galvanometric scanner and/or the second scanning device is an electro-optical scanner. In certain embodiments, the apparatus comprises a third scanning device, particularly a deformable mirror, configured to scan the excitation beam along the optical axis (in the z-direction) with respect to the sample.

In certain embodiments, the apparatus is configured to perform the steps of illuminating the sample with the stationary donut-shaped excitation beam and acquiring the fluorescence photons repeatedly, wherein a center of the donut-shaped excitation beam is positioned at a respective scanning position in each repetition, wherein particularly the scanning positions are arranged on a grid, more particularly a hexagonal grid. In particular, a mutual distance between the scanning positions is between 10% and 50% of an excitation wavelength of the excitation beam.

In certain embodiments, the acquisition means comprises an array detector comprising an array of detector elements. To acquire position specific information, the measured fluorescence photons of a plurality of detector elements of the array detector can be individually analyzed to obtain position-specific information, which can be used to determine the position estimate of the emitter. In particular, the detector elements of the array detector are arranged in a confocal plane in respect of the focal plane in the sample.

In certain embodiments, the detector elements are photon counting avalanche diodes.

In certain embodiments, the array detector is configured to acquire the fluorescence photons in a first step, wherein the processing means is configured to determine a signal intensity distribution over the detector elements of the array detector resulting from the fluorescence photons, and wherein the projection means, particularly the first scanning device, is configured to adjust a light path of the emitted light from the sample to the array detector based on the determined signal intensity distribution, and wherein the array detector is configured to acquire further fluorescence photons from the emitter using the adjusted light path in a second step subsequently to the first step, wherein particularly the processing means is configured to estimate the position of the emitter in the sample from the fluorescence photons acquired in the first step and/or the second step, wherein more particularly the projection means is configured to adjust the light path, such that a maximum of the signal intensity distribution or a signal-weighted positional average, particularly a photon-weighted positional average, of the signal intensity distribution is closer to a center of the array detector in the second step than in the first step.

In certain embodiments, the apparatus, particularly the processing means, is configured to determine the estimated position of the emitter in a pre-localization step followed by a MINFLUX localization step, particularly wherein in the MINFLUX localization step, the illumination means is configured to illuminate the sample with the donut-shaped excitation beam and positioning the donut-shaped excitation beam at a plurality of second probe positions of a second targeted coordinate pattern based on the estimated position determined in the pre-localization step, wherein in the MINFLUX localization step, the acquisition means is configured to acquire fluorescence photons for each of the second probe positions, and wherein in the MINFLUX localization step, the processing means is configured to estimate the position of the emitter in the sample from the acquired fluorescence photons at a higher resolution than in the pre-localization step, particularly by a least mean square estimator.

In certain embodiments, the second scanning device, particularly the electro-optical deflector, is configured to position the donut-shaped excitation beam at the plurality of second probe positions of the second targeted coordinate pattern.

In certain embodiments, the processing means is or comprises an integrated circuit, e.g., a field programmable gate array (FPGA) or an application specific integrated circuit (ASIC). This has the advantage that the position estimation can be performed very quickly in an automated procedure comprising a pre-localization step and a MINFLUX localization step which are executed in an automated manner. Alternatively, for example, the processing means may be a computer comprising software configured to estimate the position of the emitter. In any case, the processing means may or may not be a part of the same integrated circuit or computer as a control device controlling components of the apparatus such as the illumination means, the beam shaping device and/or the first and/or second scanning device.

A third aspect of the invention relates to a computer program comprising instructions, which, when executed by at least one processor, cause the apparatus according to the second aspect to perform the following steps for localizing an emitter in a sample: illuminating the sample with a stationary donut-shaped excitation beam, acquiring fluorescence photons, particularly in a position specific manner; and estimating a position of the emitter in the sample from the acquired fluorescence photons. In particular, the instructions of the computer program cause the illumination means of the apparatus according to the second aspect to illuminate the sample with the stationary donut-shaped excitation beam, the instructions of the computer program cause the acquisition means of the apparatus according to the second aspect to acquire the fluorescence photons. The instructions of the computer program then cause the at least one processor, particularly the processing means of the apparatus according to the second aspect, to estimate the position of the emitter from the acquired fluorescence photons.

The terms 'computer' and 'computer program' as used herein should be interpreted broadly, in other words, the computer may also be an integrated circuit, such as an FPGA or an ASIC, and the computer program may be embodied in hardware and/or software components.

In certain embodiments, the computer program is configured to determine the estimated position of the emitter in a pre-localization step followed by a MINFLUX localization step. In particular, the pre-localization step is a lateral pre-localization step which estimates the position of the emitter in a plane which is perpendicular to the optical axis along which the excitation beam propagates. More particularly, an additional axial pre-localization step to estimate the position of the emitter in an axial direction along the optical axis is performed prior to the MINFLUX-localization, even more particularly between the lateral pre-localization step and the MINFLUX localization step.

In certain embodiments, in the MINFLUX localization step, the instructions of the computer program cause the apparatus according to the second aspect, particularly the illumination means, to illuminate the sample with the donut-shaped excitation beam and position the donut-shaped excitation beam at a plurality of second probe positions of a second targeted coordinate pattern based on the estimated position determined in the pre-localization step, the instructions of the computer program cause the apparatus, particularly the acquisition means, to acquire the fluorescence photons for each of the second probe positions, and the instructions of the computer program cause the at least one processor, particularly the processing means of the apparatus according to the second aspect, to estimate the position of the emitter in the sample from the acquired fluorescence photons at a higher resolution than in the pre-localization step.

A fourth aspect of the invention, which may be applied independently of the first aspect or in combination with the first aspect, relates to a method for estimating a position of an excitable emitter, particularly an excitable fluorophore, using an excitation donut (that is, a donut-shaped excitation beam, as described above), wherein a lateral position of the excitable fluorophore is estimated in a first spatial direction and a second spatial direction from a spatially resolved detection of fluorescence emission.

All embodiments described in connection with the first, second and third aspect may also be combined freely with the fourth aspect and the embodiments described hereafter.

In particular, the spatially resolved detection of the fluorescence emission comprises detection of an Airy disk or a point image in an image plane, wherein more particularly the image plane is confocal with respect to an excitation focus.

In certain embodiments, the method is used for a lateral pre-localization of the excitable fluorophore (i.e., a localization in a plane which is perpendicular to the optical axis)

followed by a MINFLUX localization of the excitable fluorophore, wherein particularly the MINFLUX localization is performed based on the estimated position.

In certain embodiments, an additional axial pre-localization of the excitable fluorophore (i.e., a localization in a direction along the optical axis) is performed between the lateral pre-localization and the MINFLUX localization.

In certain embodiments, the excitation donut is a 2D donut or a 3D donut.

In certain embodiments, the spatially resolved detection of the fluorescence emission is performed by an array detector, particularly comprising avalanche photodiodes, particularly single photon avalanche photodiodes, SPAD.

In certain embodiments, the spatially resolved detection of the fluorescence emission is performed by scanning the Airy disk or the point image with a pinhole in a detection plane. In particular, the projection of the pinhole is guided with its center on a circular trajectory, particularly a pinhole orbit, around a center. In particular, the projection of the pinhole is placed with its center at a number of at least three, e.g., six, positions, on a circular trajectory, wherein more particularly the at least three positions are evenly spaced on the circular trajectory. In particular, said center is the center of the imagined image of an imagined point light source positioned exactly at the center of the excitation donut.

In certain embodiments, the pinhole is sized such that the image of the pinhole in the sample comprises the center of the excitation donut at all times.

In certain embodiments, the excitation donut is deflected both by a second scanning device, particularly an electro-optical scanner and by a first scanning device, particularly a galvanometric scanner. In particular, the first scanning device is positioned in a detection beam path, wherein the second scanning device is arranged outside of the detection beam path.

In certain embodiments, the scanning of the pinhole orbit while fixing the position of excitation by the excitation donut, occurs by sequentially placing, by means of the first scanning device, particularly the galvanometric scanner, the projection of the pinhole arranged in the detection beam path on the chosen positions of the pinhole orbit, while the second scanning device, particularly the electro-optical scanner, induces a countermovement of the excitation light, such that the excitation donut remains stationary in the sample.

Since during this kind of position estimation, regardless of how it is realized, the excitation donut remains stationary, and therefore the excitable fluorophore is always exposed to the same excitation intensity during the localization, the shape of the intensity distribution of the excitation donut does not immediately affect the quality of the lateral pre-localization, but at most indirectly by different signal-to-background ratios dependent on the actual position of the excitable fluorophore relative to the center of the excitation donut.

A fifth aspect of the invention relates to a microscope comprising a control device configured to control the microscope according to the method according to the fourth aspect. All embodiments described above in conjunction with the fourth aspect may be applied, mutatis mutandis, to the microscope according to the fifth aspect.

In certain embodiments, the microscope comprises an illumination means configured to illuminate an excitable fluorophore with an excitation donut.

In certain embodiments, the microscope comprises an acquisition means configured to detect fluorescence emission of the excitable fluorophore in a spatially resolved manner.

In certain embodiments, the microscope comprises a processing means configured to estimate the lateral position of the excitable fluorophore is estimated in a first spatial direction and a second spatial direction from the spatially resolved detection of fluorescence emission.

In certain embodiments, the microscope comprises a first scanning device, particularly a galvanometric scanner, configured to deflect the excitation donut, particularly perpendicular to the optical axis, more particularly wherein the first scanning device is positioned in a detection beam path of the microscope.

In certain embodiments, the microscope comprises a second scanning device, particularly an electro-optical scanner, configured to deflect the excitation donut, particularly perpendicular to the optical axis, more particularly wherein the second scanning device is positioned outside of the detection beam path of the microscope.

In certain embodiments, the microscope comprises a third scanning device, particularly comprising a deformable mirror, configured to deflect the excitation donut along the optical axis, more particularly wherein the third scanning device is positioned outside of the detection beam path of the microscope.

In certain embodiments, the microscope comprises a pinhole arranged in the detection beam path of the microscope.

In certain embodiments, the control device is configured to control the first scanning device and the second scanning device (and optionally the third scanning device) such the projection of the pinhole arranged in the detection beam path is sequentially placed, by means of the first scanning device, on positions of a circular trajectory (pinhole orbit), while the second scanning device, particularly the electro-optical scanner, (and optionally the third scanning device) induces a countermovement of the excitation light, such that the excitation donut remains stationary in the sample.

In certain embodiments, the second scanning device (and optionally the third scanning device) is configured to displace the excitation donut to second probe positions of a second targeted coordinate pattern during a MINFLUX localization following a pre-localization by pinhole orbit scanning.

In certain embodiments, the acquisition means comprises an array detector comprising a plurality of detector elements arranged in an array.

A sixth aspect of the invention relates to a computer program comprising instructions, which, when executed by at least one processor, cause the microscope according to the fifth aspect to perform the steps of the method according to the fourth aspect.

Further embodiments of the invention may be derived from the claims, the description and the drawings. Therein, the claims are not to be construed in a manner such that only subjects, devices or methods respectively comprising all or none of the features of a sub claim in addition to the features of the independent claims and aspects described herein, may be possible embodiments of the invention. In contrast, further embodiments may be drawn from features stated in the description or derivable from the drawings which may be singly or cumulatively applied.

SHORT DESCRIPTION OF FIGURES

The invention is further elucidated and described hereafter with reference to the exemplary embodiments displayed in the figures. These embodiments are non-restrictive examples which are not meant to limit the scope of the invention.

Figure 3:
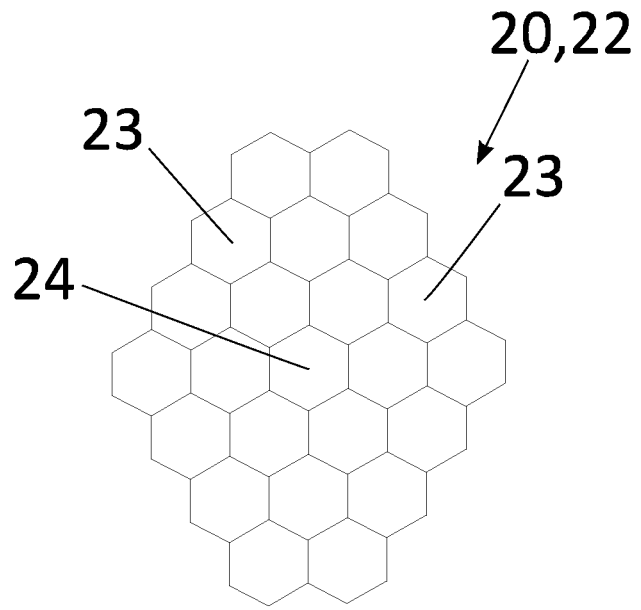
Figure 4:
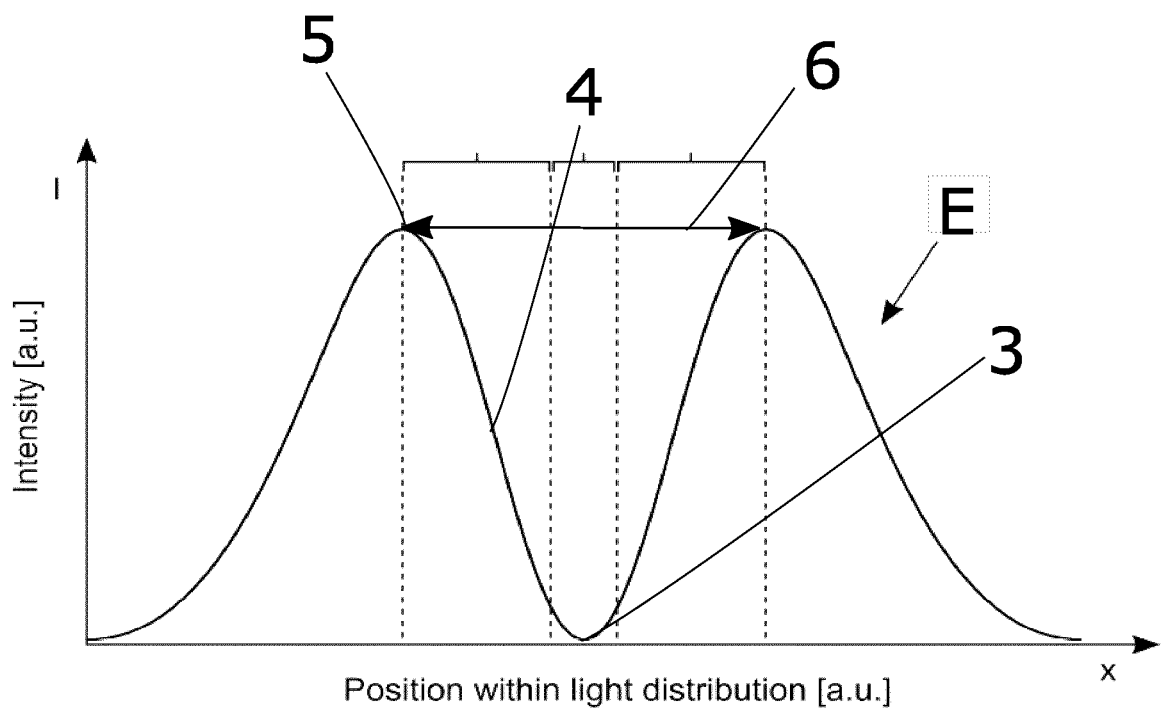
Figure 5:
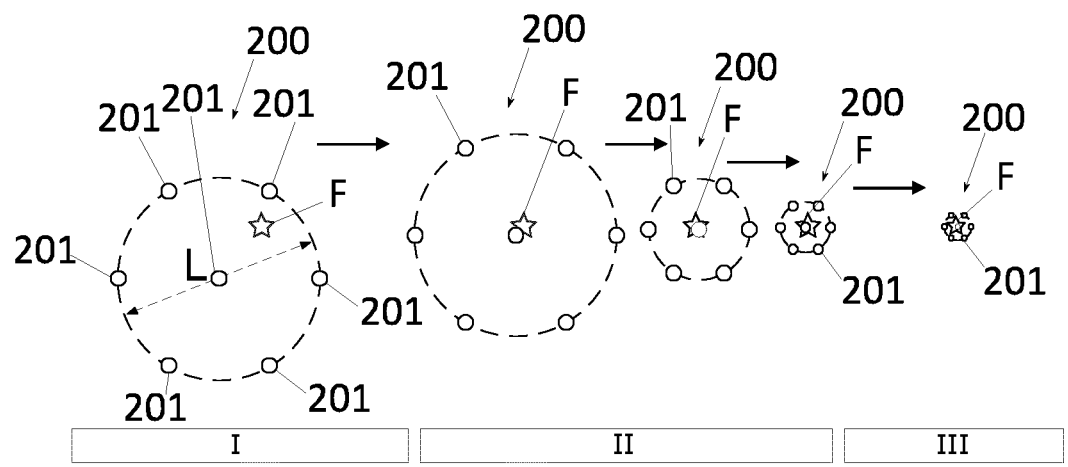
Figure 6:
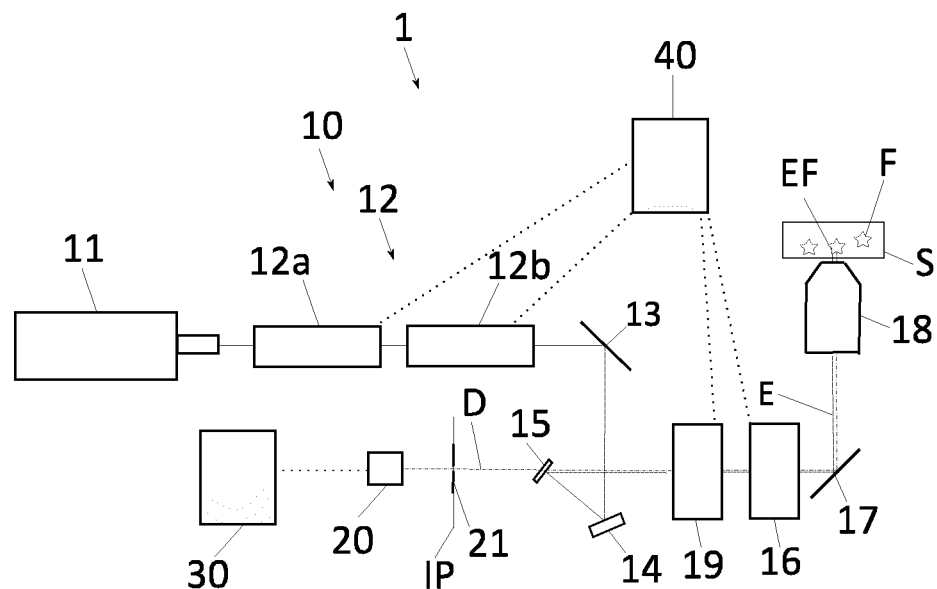

FIG. 3 schematically shows an array detector comprising a plurality of detector elements arranged in an array, the array detector being used for position-specific detection of fluorescence photons in a further embodiment of the method according to the invention;

FIG. 4 shows an example of a light intensity profile of a donut-shaped excitation beam as used by the method according to the invention;

FIG. 5 schematically shows a MINFLUX localization sequence following a pre-localization of an emitter by the method according to the invention;

FIG. 6 shows an embodiment of an apparatus (a MINFLUX microscope) according to the present invention which is configured to execute the method according to the invention.

DETAILED DESCRIPTION OF FIGURES

Figure 1:
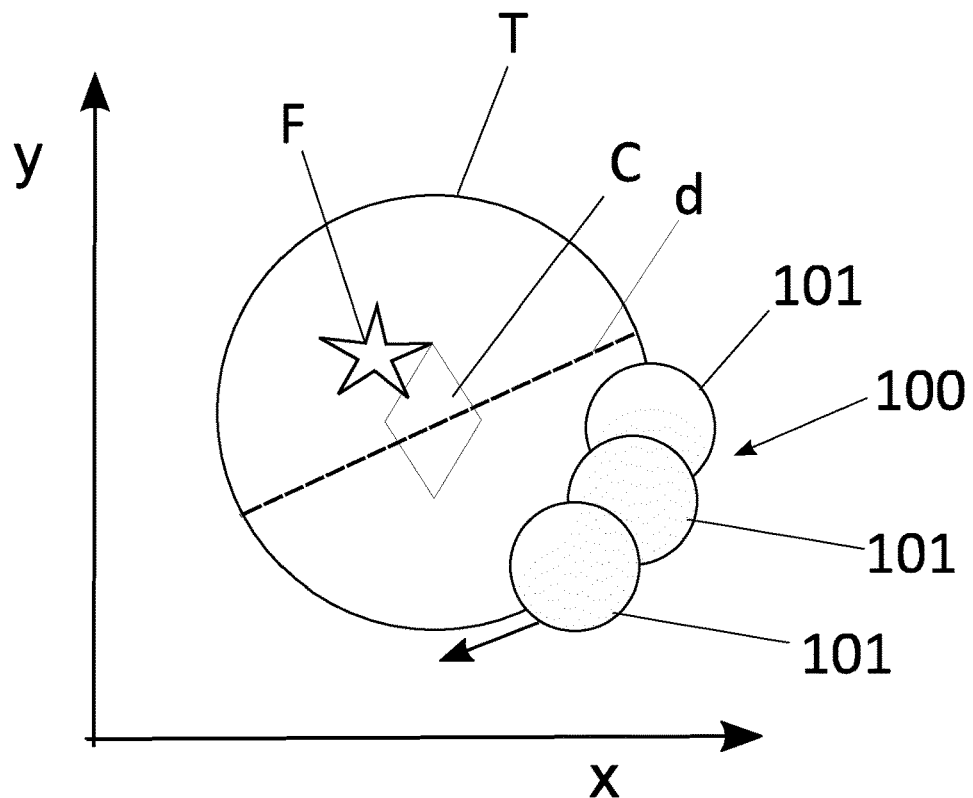
FIG. 1 shows a donut-shaped excitation beam and corresponding first probe positions of pinhole projections according to an embodiment of the method according to the invention.

FIG. 1 schematically depicts an embodiment of the method according to the invention, also termed pinhole orbit scanning, in which a sample S is illuminated with a stationary donut-shaped excitation beam E (see also FIG. 6), and an image of a pinhole 21 (see also FIG. 6) is sequentially projected to first probe positions 101 in a focal plane of an excitation focus EF in the sample S. Coordinates of the focal plane, which is perpendicular to an optical axis along which the excitation beam E propagates, are indicated by the axes x and y. A center C of the donut-shaped excitation beam E is schematically illustrated as a diamond, and the position of an emitter F, particularly a fluorescent dye molecule, which is to be localized (or pre-localized) by the method according to the present invention is depicted as a star. The first probe positions 101 form a first targeted coordinate pattern (TCP) 100.

Prior to excitation by the donut-shaped excitation beam E, the emitter F may be activated, i.e., transferred from an inactive state in which the emitter F does not emit fluorescence in response to the excitation light to an active state in which the emitter F emits fluorescence in response to the excitation light. For example, this may be achieved by illuminating the sample S with activation light of a suitable wavelength. In certain applications, it is necessary to use activatable fluorophores to be able to localize single fluorophores. Alternatively, it is also possible to use emitters which spontaneously (i.e., without illumination with activation light) cycle between the inactive state and the active state, e.g., as a result of thermal fluctuations.

The pinhole 21 (see FIG. 6, which shows the apparatus 1 according to the invention) is arranged in a detection light path of the apparatus 1 in a confocal plane (in respect of the focal plane of the sample S) between the sample S and an acquisition means 20 comprising a detector configured to detect fluorescence photons from the emitter F. In a similar manner as in confocal microscopy known from the prior art, the pinhole 21 serves to exclude out-of-focus fluorescence light, i.e., from areas of the sample S above and below the focal plane.

In an embodiment of the method according to the invention, an image of the pinhole 21 is sequentially projected to the probe positions 101 arranged around the center of the donut-shaped excitation beam E in the focal plane. In particular, this is achieved by changing the position of the de-scanned detection light (fluorescence emission from the sample) with respect to the detector of the acquisition means 20 while simultaneously shifting the position of the excitation light beam E with respect to the sample S, such that the excitation light beam E remains stationary and always illuminates the same portion of the sample S. For example, this can be implemented by controlling the position of the detection light beam E by a first scanning device 16 (see FIG. 6) arranged in the detection beam path and simultaneously adjusting the position of the excitation light beam E with respect to the sample S by a second scanning device 12 which is arranged outside of the detection beam path.

In case scanning of the excitation beam E along the optical axis (i.e., in z direction), is possible, the method according to the invention can also be applied to obtain a 3D position estimate of the emitter F. In this case, the first probe positions 101 of the first TCP 100 are particularly arranged in a volume, more particularly on a sphere, around the center of the excitation light beam E, the first scanning device 16 may be configured to scan the excitation light beam E in three dimensions, and an additional third scanning device may be used to compensate the deflection of the excitation focus in the z-direction along the optical axis.

In the example depicted in FIG. 1, the pinhole 21 is projected sequentially to three first probe positions 101 arranged on a circular trajectory T with a diameter d around a center C defined by the center of the donut-shaped excitation beam E. Importantly, the circles indicating the first probe positions 101 mark the center of the pinhole projection, and particularly do not indicate the size of the pinhole 21 which is typically much larger. In particular, the radius of the circular trajectory T is chosen such that the donut-shaped excitation beam E always overlaps with the pinhole projection at each first probe position 101. The first probe positions 101 may, but do not need to cover the whole circumference of the circular trajectory T (i.e., a full circle). Instead, the first probe positions 101 may be arranged over a partial circle (circular arch) as in the case depicted in FIG. 1.

At each first probe position 101, fluorescence photons emitted by the emitter F are acquired by the acquisition means 20 (comprising the detector). The acquired photon count or signal depends on the relative position of the respective pinhole projection and the actual position of the emitter F in the focal plane. In particular, the intensity of the fluorescence signal or the fluorescence photon count will become greater if the emitter F is closer to the center of the pinhole projection. In this manner, position specific information may be obtained without moving the donut-shaped excitation beam E with respect to the sample S. Surprisingly, only a few (particularly three or more) pinhole projections are necessary to obtain position information which is sufficient to identify and pre-localize an emitter F with a sufficient accuracy for a subsequent MINFLUX localization. Furthermore, a relatively large sample area can be searched for emitters in a short period of time due to pinhole orbit scanning.

In principle, large diameters of the circular trajectory T, on which the first probe positions 101 of the first TCP 100, i.e., the positions of the center of the pinhole 21 projection, are arranged, are favorable to quickly search larger areas of the sample S for emitters F and determine their position estimate. However, there is an upper boundary on this diameter due to the dimensions of the donut-shaped excitation beam E, since emitters F are only excited by the excitation light if they are arranged within a certain radius around the donut center, and a sufficient amount of the emitted fluorescence light must reach the detector of the acquisition means 20 at a sufficient signal-to-noise ratio in order to identify the emitter F and determine its position. To achieve this, a diameter of about 50% to 120%, particularly 60% to 100%, more particularly 70% to 90%, of a maximum-to-maximum distance of the donut-shaped excitation beam E may be favorable in case no focused activation light is provided to activate the emitters in a pre-defined volume.

In case additional activation light is provided, e.g., as a Gaussian shaped activation beam centered on the local minimum of the donut-shaped excitation beam E, the orbit scan can be adapted to scan the area of the sample, where emitters are expected to be activated with high probability. To this end, e.g., the diameter of the circular trajectory T can be set to a value of about 50% to 100%, particularly 60% to 80%, of the FWHM of a detection PSF of the emitted light.

Figure 2:
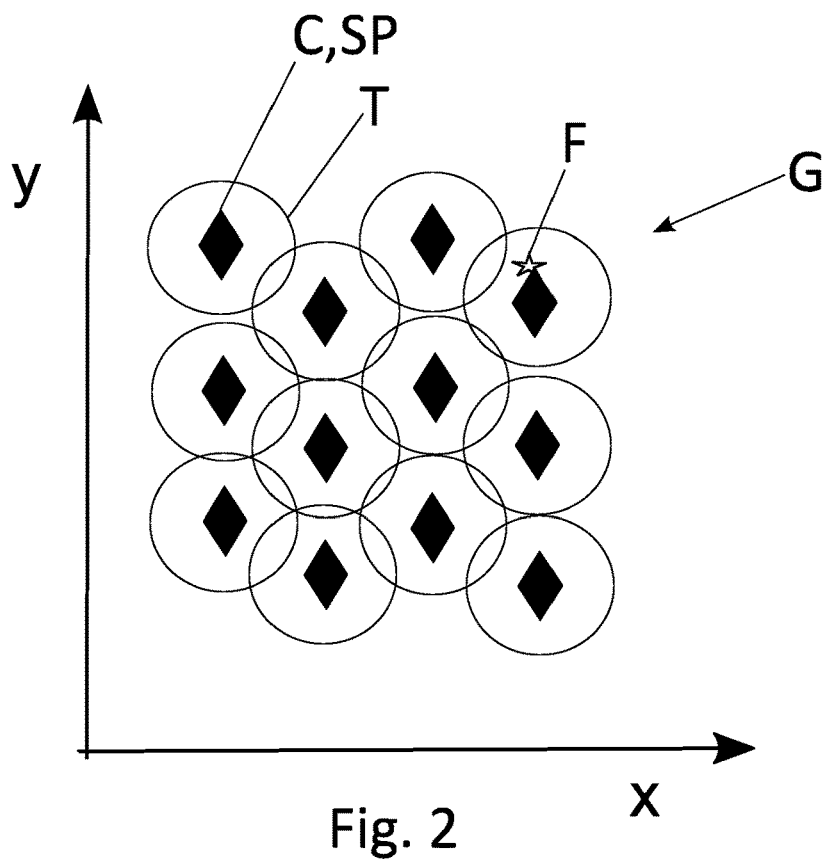
FIG. 2 shows a grid of sequential scanning positions of a donut-shaped excitation beam along with corresponding circular trajectories of first probe positions according to an embodiment of the method according to the invention.

FIG. 2 depicts a grid G of scanning positions SP, at which the center C of the donut-shaped excitation beam E can be placed sequentially during a search for a single emitter F in the sample S. The center positions of the donut-shaped excitation beam E are marked by black diamonds, and the associated circular trajectory T on which pinhole orbit scanning is performed, is depicted as a circle around the respective diamond.

An entire area of the sample S can be densely covered by the pinhole orbit trajectories T as shown in FIG. 2. In each step, the donut-shaped excitation beam E is moved with its center to a scanning position SP, and the pinhole 21 is sequentially projected with its center to first probe positions 101 arranged on the respective circular trajectory T around the respective scanning position SP. Subsequently, the excitation beam E is moved to the next scanning position SP and the process is repeated. In this manner, the entire grid G can be sequentially searched for emitters E. In particular, if a fluorescence photon count above a pre-selected threshold is acquired which indicates the presence of an emitter F, the scanning process may be aborted, and a position estimate of the emitter F may be determined from the acquired fluorescence photon counts.

Although a hexagonal grid G of scanning positions SP is shown in FIG. 2, the scope of the invention includes any suitable kind of grid pattern, such as, e.g., rectangular and irregular arrangements.

In particular, in case the sample S is confocally illuminated with activation light, it is also possible to selectively perform the method according to the invention at locations that have been illuminated by the focus of an activation light beam. This may be done at selected scanning positions SP of a grid G, such as the grid G described above or without using a grid G of scanning positions SP.

Furthermore, specific regions of interest of the sample S may be defined and selectively searched for emitters F using a grid G or in an activation-based manner. Information about such regions of interest may be obtained from previous measurements of the sample S, i.e., e.g., by confocal microscopy or widefield microscopy.

In particular, the acquisition means 20 used during the described pinhole orbit scanning, is a point detector configured to count single photons (e.g., a photomultiplier tube, a hybrid detector or an avalanche photodiode).

As an alternative to pinhole orbit scanning, an array detector 22 may be used to obtain position-specific information to identify and localize a single emitter F in the sample S. In this case, no pinhole 21 in the detection pathway is required. In case, a pinhole 21 is provided, it is typically opened completely, such that all detector elements 23 of the array detector 22 may be illuminated by the detection light.

FIG. 3 illustrates such an array detector 22 in a simplified manner. The array detector 22 which is the acquisition means 20 or is part of the acquisition means 20, comprises an active area, particularly arranged perpendicular to the optical axis of the detection beam path, wherein the active area comprises a plurality of detector elements 23 which are configured to individually detect single photons emitted by the emitter F. In the depicted example, the detector elements 23 are arranged in a hexagonal grid, but of course other configurations (such as rectangular arrangements, random arrangements, and the like) are within the scope of the present invention.

According to the embodiment of the method using the array detector 22, the center of the donut-shaped excitation beam E is placed at a scanning position SP in the sample S, and fluorescence photon counts are acquired by a plurality of the detector elements 23 of the array detector 22. Therein, each detector element 23 receives an amount of light dependent on the position of the projection of the respective detector element 23 into the focal plane in the sample S relative to the actual position of the emitter F. Depending on the relative arrangement of the detector elements 23 to the actual position of the emitter F, the detected photon count will be different for the different detector elements 23. In other words: Each detector element 23 receives an amount of light depending on the position of a projection of the respective detector element 23 in the focal plane in the sample 20 relative to the actual position of the emitter. From these photon counts, an estimate of the position of the emitter F is obtained by the processing means 30.

FIG. 4 shows an exemplary light intensity curve over a cross-section of a donut-shaped excitation beam E in the focal plane. The intensity I is plotted against the position within the donut-shaped excitation beam E, here along the x-axis (perpendicular to the optical axis along which the excitation beam propagates). The intensity curve shows a central local minimum 3, which is surrounded on all sides by intensity increase areas 4 and opposing maxima 5 having a maximum-to-maximum distance 6 along the x-axis. In particular, the curve shown in FIG. 4 depicts a cross-section of a 2D donut. A 2D cross-section through a 3D donut may result in a similar intensity curve. In particular, the 3D donut also comprises a local minimum, particularly point of zero (or near zero) intensity, in the focal plane and is surrounded by essentially ring-shaped maxima. In addition, the 3D donut comprises intensity increases neighboring the intensity minimum along the optical axis (z-direction)

The advantage of using such a donut-shaped excitation beam E to excite the emitter F in the method according to the present invention, is that the same excitation beam E can be used in a subsequent MINFLUX localization of the emitter (which requires an excitation light intensity distribution with a local minimum minimum) without switching optical components, such as beam shaping phase plates or spatial light modulators. This improves the speed of the measurement and reduces the complexity of the apparatus 1 according to the invention.

FIG. 5 shows an example of a MINFLUX localization sequence of the emitter F, which may be performed immediately after pre-localizing the emitter F by the method according to the invention. In FIG. 5, the black empty circles indicate second probe positions 201 forming a second TCP 200. During each of a number of steps (five steps are shown as an example in FIG. 5), the center of the donut-shaped excitation beam E is placed sequentially at the second probe positions 201 of the respective second targeted coordinate pattern 200, and fluorescence photons from the emitter F are acquired at each of the second probe positions 201. The obtained fluorescence intensity or photon count varies depending on the relative position of the emitter F and the respective second probe position 201. If the emitter F is located exactly at the center of the donut-shaped excitation beam E, where the excitation light intensity is zero or close to zero, no fluorescence signal or photon count is obtained above the background. At increasing distances from the center, however, the emitter F is exposed to higher excitation light intensities (see FIG. 4), and therefore emits a higher number of fluorescence photons per unit of time. From the obtained photon counts and the associated second probe positions 201, the position of the emitter F can be estimated, e.g., using a least mean square estimator, as described in the prior art.

In the example shown in FIG. 5, a second TCP 200 comprising seven second probe positions 201 arranged in the focal plane is shown. One of the second probe positions 201 is at a center of a circle with a radius L, and the other six second probe positions 201 are evenly spaced around the circumference of the circle. Therein, the center of the circle corresponds to an estimated location of the emitter F, in a given step. For the first step shown in FIG. 5 (labeled I), the position estimate obtained in a pre-localization step according to the present invention may be used. In MINFLUX methods of the prior art, this pre-localization has been performed, e.g., by camera imaging (similar to PALM/STORM microscopy) or by excitation with a Gaussian shaped excitation beam at several positions in the vicinity of an expected emitter position. Here, however, the same excitation beam shape can be used both in the pre-localization step, and in the subsequent high-precision MINFLUX localization obviating the need to switch optical components.

After the first step (I), a series of further MINFLUX steps (three steps in the sub-sequence labeled II and a further final step labeled III) is performed, wherein in each step, the position estimate of the emitter F determined in the previous step is used as the new center of the second TCP 200, i.e., the second TCP 200 is recentered using the previously obtained position information in each step.

In particular, the radius L of the circle defining the second TCP is reduced in each step or in a subset of the steps. According to FIG. 5, the radius L remains the same between step I and the first step of sub-sequence II but is reduced in each subsequent step. In this manner, the position estimation in each iteration becomes more and more accurate. Since the center of the excitation beam E tends to get closer to the actual position of the emitter F the smaller the circle defining the second TCP 200 gets, the average of the obtained fluorescence photon counts also decreases. To compensate this effect, the intensity of the excitation light may be increased as the MINFLUX sequence proceeds to obtain higher photon counts and thus improve the signal-to-noise ratio.

The last step (III) is a final localization of the emitter F, where the circle delimiting the second TCP 200 is so small that the fluorescence signal has decreased almost to the background, i.e., the position estimate is converging to a value of a maximum accuracy according to the boundary conditions of the experiment. In typical MINFLUX applications, this accuracy may be in the range of 1-2 nm.

Of course, the shown second TCPs 200 are merely an example, and may be replaced with any other suitable second TCP 200. Furthermore, although FIG. 5 shows a 2D MINFLUX sequence, where the second probe positions 201 are arranged in the focal plane, the method according to the present invention may also be applied to a 3D MINFLUX sequence. In this case, the donut-shaped excitation beam E is typically a 3D donut or bottle beam (with a central intensity minimum flanked by areas of increasing intensity in all directions in space), and the second TCP 200 comprises second probe positions 201 outside of (above and below) the focal plane.

FIG. 6 shows a simplified scheme of an apparatus 1 according to an embodiment of the present invention, particularly a MINFLUX microscope.

The apparatus 1 includes an illumination means 10 configured to illuminate a sample S with a donut-shaped excitation beam E, the illumination means 10 comprising a light source 11 (e.g., a laser source) configured to generate a light beam of excitation light capable of exciting an emitter F in the sample S, a phase modulator 14 (e.g., a spatial light modulator or a phase plate) configured to shape the beam of the excitation light into a donut, a microscope objective 18 configured to focus the donut-shaped excitation beam E into the sample S, a first scanning device 16 (particularly a galvanometric scanner), a second scanning device 12 (particularly comprising electro-optical scanners 12a and 12b) and a third scanning device 19 (particularly comprising a deformable mirror) configured to displace the donut-shaped excitation beam E, a dichroic beam splitter 15 configured to separate excitation light and detection light (fluorescence emitted by the emitter F), and mirrors 13,17.

In particular, the first scanning device 16 and the second scanning device 12 are configured to displace the excitation beam E in a first direction x and a second direction y perpendicular to the optical axis along which the excitation beam E propagates (the first direction x being perpendicular to the second direction y). To this end, the first scanning device 16 may comprise at least a first rotatable mirror and a second rotatable mirror (not shown), each being coupled to a respective drive (e.g., a galvanometer drive). As shown in FIG. 6, the second scanning device 12 may comprise a first electro-optical modulator 12a configured to displace the excitation beam in the first direction x and a second electro-optical modulator 12b configured to displace the excitation beam in the second direction y, wherein the first electro-optical modulator 12a and the second electro-optical modulator 12b are arranged in series in the beam path of the excitation beam E.

In particular, the third scanning device 19 is configured to displace the excitation focus EF of the excitation beam E in a third direction z along the optical axis. To this end, the third scanning device 19 may comprise a deformable mirror configured to displace the excitation focus EF by deformation of its surface when the excitation beam E is reflected on the surface and refractive elements configured to direct the excitation beam E towards the deformable mirror, such that the excitation beam E is reflected on the deformable mirror and couple the reflected excitation beam E back into the beam path.

Furthermore, the apparatus 1 comprises an acquisition means 20, i.e., a point detector or an array detector configured to detect fluorescence photons emitted by an emitter F in the sample S, a pinhole 21 arranged in an image plane IP which is confocal with respect to a focal plane of an excitation focus EF of the donut-shaped excitation beam E, a processing means 30 configured to estimate a position of the emitter E in the sample S from the acquired fluorescence photons, and a control device 40 configured to control the first scanning device 16 and the second scanning device 12.

The excitation light beam E generated by the light source 11 passes the second scanning device 12 and is reflected by the mirror 13 onto the phase modulator 14. The phase modulator 14 is depicted as a reflective element in FIG. 6, which results in a reflected phase-modulated excitation beam E that is reflected by the dichroic beam splitter 15, passes the first scanning device 16 (e.g., the galvanometric scanner), and is reflected by the mirror 17 to the objective 18, which serves to focus the excitation light beam E into the sample S. The dichroic beam splitter 15 is reflective for light of the excitation wavelength and transmissive for light of the fluorescence emission wavelength.

The phase pattern introduced to the excitation light beam E by the phase modulator 14 results in a donut-shaped light intensity distribution at the excitation focus EF. The phase modulator 14 is particularly arranged in a plane which is conjugated to a pupil plane of the objective 18, or in the vicinity of such a plane. In particular, an excitation light beam E shaped as a 2D donut can be generated by a vortex phase pattern increasing gradually from a phase value of zero to a value of $2n \cdot \pi$, where n is a natural number (wherein particularly n=1) in a circumferential direction with respect to the optical axis in combination with a polarization modifying element (not shown in FIG. 6), e.g., a quarter wave plate (not shown), which generates circularly polarized light. A 3D donut, also termed bottle beam, can be obtained, in particular by phase modulation of the excitation light beam E with a phase pattern comprising concentric rings with a phase difference of Although a reflective phase modulator 14, such as a spatial light modulator, is shown in FIG. 6, a transmissive phase modulator 14, (e.g., a phase plate), may be used instead in the apparatus 1.

The emission light emitted by the emitter F in the sample S (detection beam D) is picked up by the objective 18 and reflected by mirror 17 onto the first scanning device 16, which de-scans the detection beam D. The de-scanned detection beam D passes the dichroic beam splitter 15, the confocal pinhole 21, which removes out-of-focus light, and is detected by the acquisition means 20, particularly by a point detector comprising a photomultiplier tube, a hybrid detector or an avalanche photodiode, or an array of such detectors.

According to the embodiment described above as "pinhole orbit scanning" when using the apparatus 1 shown in FIG. 6, the donut-shaped excitation light beam E is first moved to a scanning position SP in the sample S using the first scanning device 16. Then, the image of the pinhole 21 is sequentially projected to first probe positions 101 of a first targeted coordinate pattern 100 using the first scanning device 16, while the second scanning device 12 (and optionally the third scanning device 19 in case of a 3D-scan) deflects the excitation beam E without affecting the detection beam path to compensate the displacement by the first scanning device 16 to keep the donut-shaped excitation beam E stationary with respect to the sample S. Therein, the first scanning device 16 and the second scanning device 12 (and optionally the third scanning device 19) receive control signals from the control device 40. For each first probe position 101, fluorescence photons are acquired by the acquisition means 20.

According to another embodiment, the acquisition means 20 comprises an array detector 22 comprising an array of detector element 23 (see FIG. 3), each of which is configured to independently detect single photons emitted by the emitter F. The array detector 22 comprises a center 24, which is a single detector element 23 according to the example shown in FIG. 3. If an array detector 22 is used for photon detection, no pinhole 21 is needed in the detection beam path of the apparatus 1. If nevertheless a pinhole 21 is arranged in the detection beam path, the pinhole 21 is typically fully opened to maximize the amount of light impinging on the array detector 22. In this embodiment, the excitation focus EF of the excitation light beam E is moved to a scanning position SP in the sample S, particularly by the first scanning device 16, while the center of the array detector is arranged confocally in respect of the center of the donut-shaped excitation beam E. Fluorescence photons are then acquired by a plurality of detector elements 23 of the array detector 22.

According to both embodiments described above, the acquisition means 20 converts the received fluorescence photons into a signal which is processed by the processing means 30. The processing means 30 may further receive an input signal from the first scanning device 16 and, in particular, the second scanning device 12 and/or the third scanning device 19, wherein the input signal contains position information about the current position of the excitation light beam E and, in particular, the image of the pinhole 21, such that the processing means 30 may determine a position estimate of the emitter F based on the acquired fluorescence photons and the position information, e.g., by a least mean square estimator. In case of array detection, the processing means 30 may receive signals from the acquisition means 20 indicating the positions of the detector elements 23 which have received the corresponding photon counts.

After determining the position estimate of the emitter F, a MINFLUX localization may be performed by the apparatus 1. To this end, the donut-shaped excitation beam E is sequentially moved with its center to second probe positions 201 of a second TCP 200 (see FIG. 5) using the second scanning device 12, the second TCP being centered on the position estimate determined by the method according to the invention (e.g., pinhole orbit scanning or array detection using a stationary donut-shaped excitation beam E), and fluorescence photons are acquired by the acquisition means 20 for each second probe position 201. A new position estimate is then determined by the processing means 30 based on the acquired fluorescence photons and the second probe positions 201. Next, the second TCP 200 is centered on the new position estimate, and the MINFLUX sequence is iteratively repeated with second TCPs 200 within a decreasing radius L around the current position estimate. This process is particularly continued until the position estimate converges or alternatively until the emitter F is deactivated or bleached. In particular, in each iteration, the light intensity of the excitation light may be increased to compensate for the decreasing emission signal.

LIST OF REFERENCE SIGNS

1 Apparatus for localizing an emitter in a sample
3 Minimum
4 Intensity increase area
5 Maximum
6 Maximum-to-maximum distance
10 Illumination means
11 Light source 12 Second scanning device
12a First electro-optical modulator
12b Second electro-optical modulator
13 Mirror
14 Phase modulator
15 Beam splitter
16 First scanning device
17 Mirror
18 Objective
19 Third scanning device
20 Acquisition means
21 Pinhole
22 Array detector
23 Detector element
24 Center of array detector
30 Processing means
40 Control device
100 First targeted coordinate pattern (TCP)
101 First probe position
200 Second targeted coordinate pattern (TCP)
201 Second probe position
C Center of trajectory
d Diameter of trajectory
D Detection beam
E Excitation beam
EF Excitation focus
F Emitter
G Grid
IP Image plane
L Radius
SP Scanning position
T Trajectory

The invention claimed is:

1. A method for localizing an emitter in a sample comprising
illuminating the sample with a stationary excitation beam which is donut-shaped at a focus of the excitation beam,
acquiring fluorescence photons; and
estimating a position of the emitter in the sample from the acquired fluorescence photons, wherein the emitter is a single fluorescent dye molecule;
wherein the method comprises projecting a pinhole to first probe positions, wherein the fluorescence photons are acquired for the first probe positions, wherein the pinhole is moved on a circular trajectory around a center or is sequentially placed on at least three of the first probe positions on a circular trajectory.

2. The method according to claim 1, wherein the donut-shaped excitation beam comprises a maximum-to-maximum distance, wherein a diameter of the circular trajectory is 50% to 120% of the maximum-to-maximum distance.

3. The method according to claim 1, wherein a diameter of the circular trajectory is 50% to 100% of a full-width-at-half-maximum of a detection point spread function of the emitted light.

4. The method according to claim 1, wherein the excitation beam is kept stationary using a first scanning device and a second scanning device that act in concert.

5. The method according to claim 4, wherein the first scanning device is a galvanometric scanner and the second scanning device is an electro-optical scanner.

6. The method according to claim 1, wherein the steps of illuminating the sample with the stationary donut-shaped excitation beam and acquiring the fluorescence photons are carried out repeatedly, wherein a center of the donut-shaped excitation beam is positioned at a respective scanning position in each repetition.

7. The method according to claim 6, wherein the scanning positions are arranged on a grid, wherein a mutual distance between the scanning positions is between 10% and 50% of an excitation wavelength of the excitation beam.

8. The method according to claim 1, wherein the estimated position of the emitter is determined in a pre-localization step followed by a MINFLUX localization step, wherein the MINFLUX localization step comprises illuminating the sample with said donut-shaped excitation beam, positioning the donut-shaped excitation beam at a plurality of second probe positions of a second targeted coordinate pattern based on the estimated position determined in the pre-localization step, acquiring fluorescence photons for each of the second probe positions, and estimating the position of the emitter in the sample from the acquired fluorescence photons at a higher resolution than in the pre-localization step.

9. An apparatus for localizing an emitter in a sample comprising:
an illuminator configured to illuminate the sample with a stationary excitation beam which is donut-shaped at a focus of the excitation beam;
a detector configured to acquire fluorescence photons; and
a processor configured to estimate a position of the emitter in the sample from the acquired fluorescence photons, wherein the emitter is a single fluorescent dye molecule;
wherein the apparatus comprises a projector configured to project a pinhole to first probe positions, wherein the fluorescence photons are acquired for the first probe positions; and
wherein the projector is configured such that the pinhole is moved on a circular trajectory around a center or is sequentially placed on at least three of the first probe positions on a circular trajectory.

10. A method for localizing an emitter in a sample comprising:
illuminating the sample with a stationary excitation beam which is donut-shaped at a focus of the excitation beam,
acquiring fluorescence photons; and
estimating a position of the emitter in the sample from the acquired fluorescence photons, wherein the emitter is a single fluorescent dye molecule;
wherein the steps of illuminating the sample with the stationary donut-shaped excitation beam and acquiring the fluorescence photons are carried out repeatedly, wherein a center of the donut-shaped excitation beam is positioned at a respective scanning position in each repetition, wherein the scanning positions are arranged on a grid, wherein a mutual distance between the scanning positions is between 10% and 50% of an excitation wavelength of the excitation beam.

11. The method according to claim 10, wherein the fluorescence photons are acquired in a position-specific manner.

12. The method according to claim 11, wherein the position-specific acquisition of the fluorescence photons is performed in an image plane arranged confocally with respect to a plane of an excitation focus of the excitation beam.

13. The method according to claim 10, wherein the fluorescence photons are acquired by an array detector comprising an array of detector elements.

14. The method according to claim 13, wherein the detector elements are photon counting avalanche diodes.

15. The method according to claim 13, wherein the fluorescence photons are acquired by the array detector in a first step, wherein a signal intensity distribution over the detector elements of the array detector resulting from the fluorescence photons is determined, and wherein a light path of the emitted light from the sample to the array detector is adjusted based on the determined signal intensity distribution, and wherein in a second step subsequently to the first step, further fluorescence photons from the emitter are acquired by the array detector using the adjusted light path.

16. The method according to claim 10, wherein the estimated position of the emitter is determined in a pre-localization step followed by a MINFLUX localization step, wherein the MINFLUX localization step comprises illuminating the sample with said donut-shaped excitation beam, positioning the donut-shaped excitation beam at a plurality of second probe positions of a second targeted coordinate pattern based on the estimated position determined in the pre-localization step, acquiring fluorescence photons for each of the second probe positions, and estimating the position of the emitter in the sample from the acquired fluorescence photons at a higher resolution than in the pre-localization step.

17. An apparatus for localizing an emitter in a sample, comprising:
an illuminator configured to illuminate the sample with a stationary excitation beam which is donut-shaped at a focus of the excitation beam;
a detector configured to acquire fluorescence photons; and
a processor configured to estimate a position of the emitter in the sample from the acquired fluorescence photons, wherein the emitter is a single fluorescent dye molecule,
wherein the illuminator and the detector are configured to carry out repeatedly the steps of illuminating the sample with the stationary donut-shaped excitation beam and acquiring the fluorescence photons, wherein the illuminator is configured to position a center of the donut-shaped excitation beam at a respective scanning position in each repetition, wherein the scanning positions are arranged on a grid, wherein a mutual distance between the scanning positions is between 10% and 50% of an excitation wavelength of the excitation beam.

18. The apparatus according to claim 17, wherein the apparatus comprises a projector configured to project a pinhole to first probe positions.

19. The apparatus according to claim 18, wherein the projector is configured such that the pinhole is moved on a circular trajectory around a center or is sequentially placed on at least three of the first probe positions on a circular trajectory.

20. The apparatus according to claim 17, wherein the detector comprises an array detector comprising an array of detector elements.

* * * * *